May 16, 1961  R. C. COBLENTZ  2,984,082
AIR CONDITIONING SYSTEM
Filed Dec. 10, 1956  3 Sheets-Sheet 1

INVENTOR.
Robert C Coblentz
BY
Ralph Hammar
Attorney

May 16, 1961

R. C. COBLENTZ 2,984,082

AIR CONDITIONING SYSTEM

Filed Dec. 10, 1956

3 Sheets-Sheet 2

INVENTOR.
Robert C Coblentz
BY Ralph Hammar
Attorney

United States Patent Office 2,984,082
Patented May 16, 1961

2,984,082

AIR CONDITIONING SYSTEM

Robert C. Coblentz, 1226 W. 9th St., Erie, Pa.

Filed Dec. 10, 1956, Ser. No. 627,305

5 Claims. (Cl. 62—180)

This invention is an air conditioning system which is controlled in part by the outside air temperature and which permits individual control of the temperature in different rooms without upsetting the air circulation. The system is adapted to year round air conditioning as well as for summer cooling only. Since comfort is affected by the freshness of the air as well as by its temperature and humidity, a $CO_2$ meter may be used to control the admission of outside air. The control sections can be made as units for addition to package air conditioning units.

Figure 1:
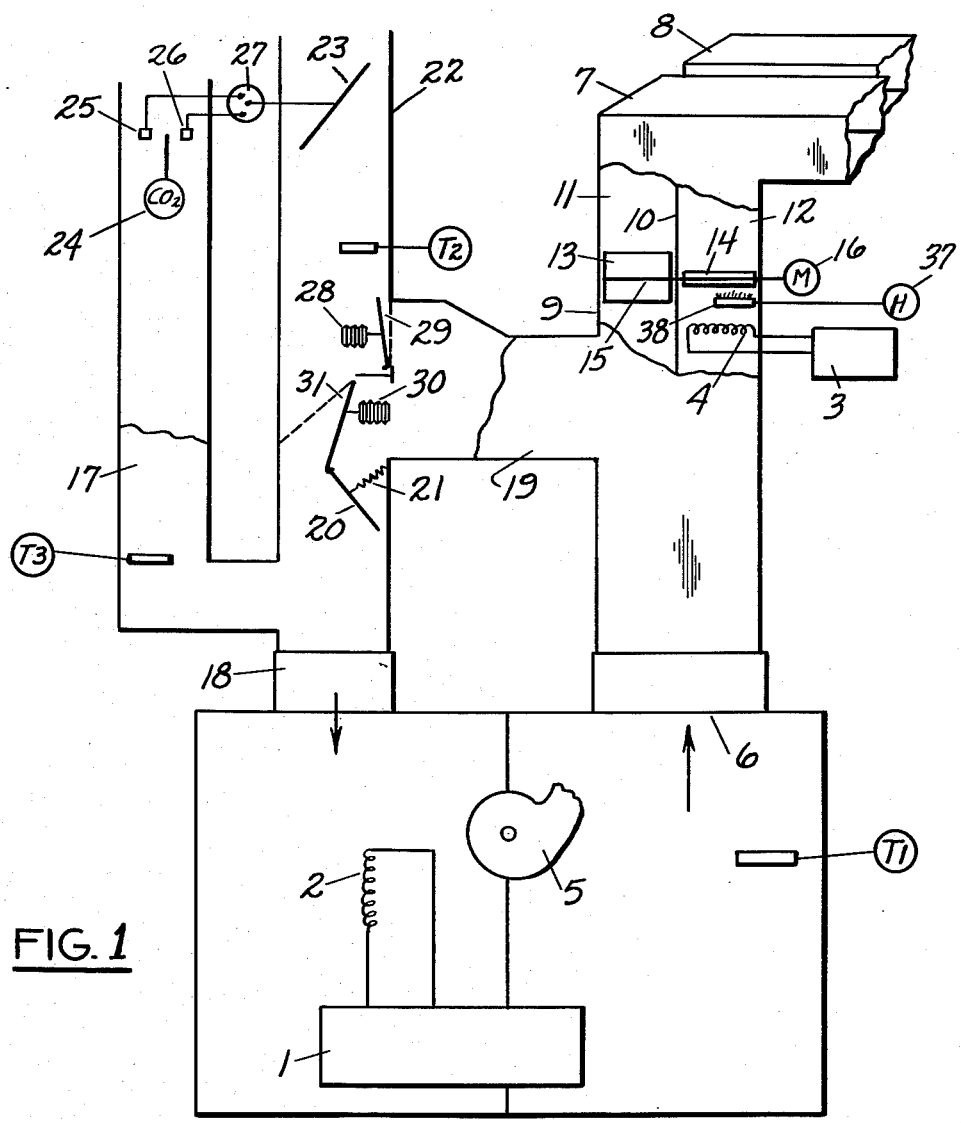
Figure 3:
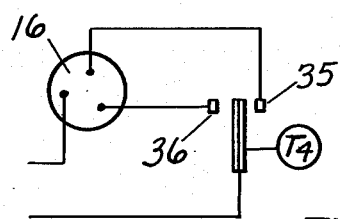
Figure 2:
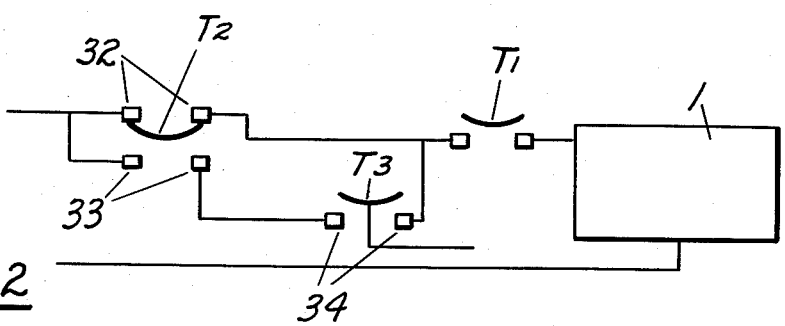
Figure 5:
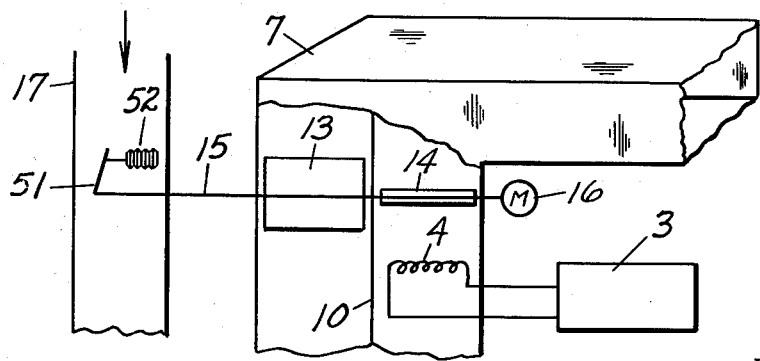
Figure 4:
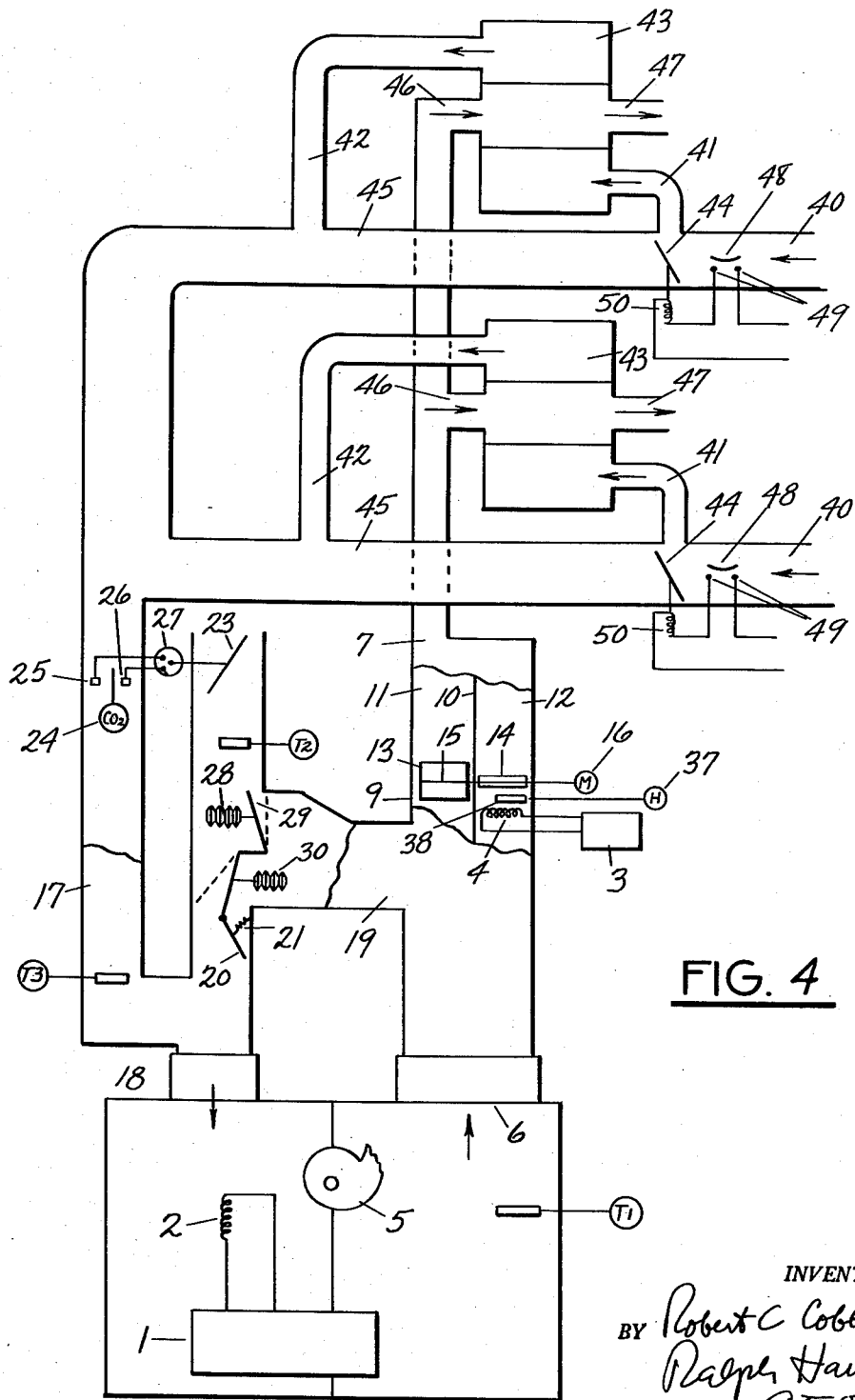

In the drawings, Fig. 1 is a diagrammatic view of an air conditioning system; Fig. 2 is a control diagram for the refrigerating unit; Fig. 3 is a control diagram for the mixing damper; Fig. 4 is a diagrammatic view of a structure for providing individually controllable room temperatures in separate rooms without interfering with the air circulation; and Fig. 5 is a view showing an alternative arrangement for positioning the mixing dampers.

In the system shown in Fig. 1, there is a refrigerating unit 1 for supplying an evaporator or cooling coil 2 and a heating unit 3 for supplying a heating coil 4. The heating unit 3 may be any readily available source of heat such as the condenser cooling water from the refrigerating unit 1 or a steam boiler.

The air to be conditioned is forced by a fan 5 over the cooling coil 2 and is discharged through an outlet 6. The refrigerating unit 1, cooling coil 2 and fan 5 may be a standard package air conditioning unit.

The outlet 6 is connected to one or more distributing ducts 7 and 8 leading to the zones or areas to be air conditioned. It will be understood that each of the ducts 7, 8 may have one or more conditioned air outlets or registers which may be individually controlled in accordance with the wishes of the occupants. The outlet ducts 7, 8 are conveniently arranged side by side with their lower ends 9 connected to the common outlet 6.

Each of the ducts 7, 8 is divided by a partition 10 into a passageway 11 for cooled air and a passageway 12 for heated air. The flow of air through the passageways 11, 12 is controlled by mixing dampers 13, 14 at right angles to each other and mounted on a common shaft 15 positioned by a damper motor 16. When the dampers 13, 14 are in the position shown, the flow of air through the passageway 12 is blocked so that no air flows over the heating coil 4. All of the cooled air flows through the passageway 11 because the damper 13 in that passageway is in its open position where it in no way restricts the flow of air. The position of the dampers 13, 14 illustrated is that normal for conditions under which the only requirement for the air conditioning system is the cooling of the air. By turning the shaft 15 ninety degrees from the position illustrated, the damper 13 will entirely block the flow of cooled air through the passageway 11 and all of the air will flow through the passageway 12 and be heated by the heating coil 4. That would be the normal position of the dampers when the entire air conditioning load is a heating load. At intermediate positions of the shaft 15, the air flowing to the duct 7 will be a mixture of heated and cooled air which, for example, might be desirable when the air has been cooled for dehumidification but the outside air temperature was such as to require heating in order to maintain a comfortable room temperature. It will be understood that the dampers and damper motor 13—16 shown in connection with the duct 7 are duplicated in the other ducts such as the duct 8 and that because the ducts may supply zones having different air conditioning requirements, the position of the dampers in the individual ducts will not necessarily be the same. For example, the difference between the sunny side and the shady side of a building will greatly modify the air conditioning load.

While separate ducts 7, 8 are provided for the conditioned air, in many cases there is no need for the returned air to be carried by separate ducts. The return air from the condition zones, accordingly, is shown flowing through a common duct 17 connected to inlet duct 18 on the suction side of the fan. The fan runs all of the time for purposes of ventilation regardless of whether or not there is any air conditioning load. This is desirable because in many installations the zones to be air conditioned are sealed so that the air conditioning system must provide the ventilation as well as the conditioning.

It will be noted that there is a recycling duct 19 connected from the fan discharge outlet 6 back to the duct 18 on the suction side of the fan. The air flowing through the recycling duct 19 is in part controlled by a damper 20 which is biased to the closed position by a tension spring 21. The pressure of the air in the recycling duct 19 tends to open the damper 20 and permit the greater flow of recycled air while the spring 21 tends to close the damper. This results in the maintenance of substantially constant air pressure in the discharge 6 which is advantageous in case registers are closed. In the normal air conditioning system, when a number of the outlets for the conditioned air are closed, the air pressure tends to build up causing objectionably high velocities through the remaining outlets. Because of the pressure control provided by the damper 20, this build up in pressure is not possible in the present system so that the closure or throttling of one or more of the outlets for conditioned air does not interfere with the air flow through the remaining outlets. For example, it is desirable that closing of the conditioned air outlet to an office supplied by the duct 7 not affect or change the air conditioning in an office supplied by the duct 8.

The supply of fresh air for ventilation is through a duct 22 having a control damper 23 positioned under the control of a $CO_2$ meter 24 suitably positioned, for example, in the return air duct 17. The $CO_2$ meter 24 measures the quantity of $CO_2$ in the return air and closes a contact 25 when the $CO_2$ content is too high and a contact 26 when the $CO_2$ content is too low. Closing the contact 25 actuates a damper motor 27 in the direction to open the damper 23, while closing the contact 26 actuates the motor 27 in the direction to close the damper 23. Accordingly, the $CO_2$ meter maintains the desired degree of freshness in the conditioned air space.

On its way to the intake duct 18, the fresh air flows over a thermostatic bellows 28 which holds a damper 29 open (full lines in Fig. 1) when the temperature of the fresh air is below 50° and closes the damper (dotted lines in Fig. 1) when the temperature of the outside air is above 50°. When the damper 29 is open, some of the air circulating through the recycling duct 19 mixes with the fresh air to temper the air so that excessively cold air will not be delivered to the suction inlet of the fan. Within the recycling duct 19 is a thermostatic bellows 30 controlling a damper 31 which provides an additional control for the fresh air intake. During the summer when the air in the duct 19 is cooled, the bellows 30 contracts moving the damper 31 toward the open position (full lines in Fig. 1) and thereby providing a larger amount of fresh air which is desirable for ventilation during the summer. During the winter, when there is no cooling of the conditioned air, the temperature of the air in the recycling duct 19 will be substantially room temperature and the thermostatic bellows 30 will expand moving the damper 31 toward the closed position (dotted lines in Fig. 1). This provides the lesser amount of outside air required for ventilation during the winter when the air leakage from the outside may be relied upon to supply a substantial amount of the fresh air required for ventilation.

The primary control for the refrigerating unit 1 is by a thermostat $T_1$ located in the outlet side of the cooling coil 2. The thermostat $T_1$ can be regarded as the dew point controller for the conditioned air. When set to operate during the range between 45° F. and 55° F., the thermostat $T_1$ maintains the cooled air temperature at the value such that the moisture content of the air corresponds to maximum comfort. In this range of cooled air temperatures, the moisture content of the air ranges from 40 to 60 grains of moisture per pound of dry air which is the amount required for maximum comfort. Accordingly, by controlling the cooled air temperature in the output of the refrigerating unit so that it ranges between 45° F. and 55° F., the proper amount of moisture for maximum comfort is insured without the need for any humidostat. The thermostat $T_1$ also automatically prevents any frosting of the evaporator 2. The thermostat $T_1$ therefore performs the function of a defrost control and a humidity control. The on-off control provided by the thermostat $T_1$ adjusts the on time of the unit to the load. When the air conditioning load is heavy, it will take a long time for the air to drop from 55° to 45° and when the unit shuts off on reaching 45°, the heavy air conditioning load will cause the temperature to quickly rise to 55° at which time the unit will come on again. When the load is heavy, the air conditioning unit runs practically all of the time. On the other hand, when the air conditioning load is light, the temperature of the cooled air leaving the unit will quickly be pulled down to 45° and will rise to 55° more slowly. Accordingly, the thermostat $T_1$ has a modulating control function matching the on time of the unit to the load.

Because the fan 5 runs continuously and delivers air to the room containing from 40 to 60 grains moisture per pound of dry air, the air in the room will approach a moisture content between those limits. This will happen because of the continuous recirculation provided by the fan. The moisture content of the air in the room will be independent of the room air temperature.

But, it may be noticed that in the air conditioning system, outside air is admitted through duct 22 for ventilation purposes and during some seasons of the year the outside air temperature may be low enough so that the moisture content of the air will not be excessive. Under these conditions, there is no need to run the refrigerating unit 1 for cooling because all of the cooling can be supplied from the outside air. Accordingly, the thermostat $T_1$ is shown in series with a thermostat $T_2$ in the outside air duct having contacts 32 which are closed when the outside air temperature is above 60° and contacts 33 which are closed when the outside air temperature drops to 50° and below. Accordingly, when the outside air temperature is above 60° and cooling would be required at least for the purpose of dehumidification, or for humidity control, the refrigerating unit is under the control of the thermostat $T_1$ which turns the refrigerating unit on when the temperature of the cooled air rises to 55° and off when the temperature of the cooled air drops to 45°, thereby maintaining the cooled air in the range at which its moisture content provides maximum comfort. When the temperature of the outside air drops to 50°, the thermostat $T_2$ closes the contacts 33 in series with contacts 34 of a thermostat $T_3$ in the return air duct 17. So long as the temperature of the return air is below a selected value, for example, 78° F. in summer or 74° F. in winter, the contacts 34 are open and operation of the refrigerating unit is stopped. If the temperature of the return air rises above the selected value due to heat generated within the air conditioned zone, it is necessary to supply cooling even though the outside air temperature is below 50°. Under these conditions, the thermostat $T_3$ closes the contacts 34 and places the refrigerating unit in operation subject to the primary control of the thermostat $T_1$.

When the refrigerating unit 1 is operating, the air leaving the outlet is continuously maintained between 45° F. and 55° F. by the dew point regulating thermostat $T_1$. When the refrigerating unit 1 is shut down, then the temperature of the air in the outlet 6 corresponds to the temperature of the air in the return air duct 17 and may be substantially higher, for example, 70° F. In order to maintain the proper conditioned air temperature in the ducts 7 and 8, it is necessary to change the position of the dampers 13 and 14. During the summer when the entire air conditioning load is cooling, the damper 13 should be open and the damper 14 should be shut. During the winter when the entire air conditioning load is heating, the reverse should be true, namely, the damper 14 should be open and the damper 13 shut. During the spring and fall when there may be need for cooling of the conditioned air for dehumidification and heating of the conditioned air in order to bring the room temperature up to the desired comfort level, the dampers 13, 14 should be at intermediate positions. This is effected under the control of a thermostat $T_4$ in each of the zones to be conditioned. For example, in the system illustrated there will be thermostat $T_4$ in the zone conditioned by each of the ducts 7 and 8. The thermostat $T_4$ sets the room temperature level. When the temperature is too high, the thermostat closes contact 35 which causes the damper motor 16 to run in the direction to close the damper 14 and to open the damper 13. When the temperature is too low, the thermostat $T_4$ closes the contact 36 which causes the motor 16 to run in the opposite direction.

In the winter, when the room air may be too dry for comfort, it is desirable to add moisture to the air in order to raise the humidity. This is done under the control of a room air humidostat 37 which controls a steam or water spray 38 discharging in the vicinity of the heating coil 4. The humidostat 37 is ordinarily set for a value substantially lower than the humidity present in the conditioned air in the summer so that the addition of humidity to the conditioned air does not take place during the summer but is limited to the winter when the air is drier. By having the humidostat 37 set substantially below the range of summer humidity, it can be left on year round and will only come into operation when needed during the winter for increasing the moisture content of the conditioned air.

In Fig. 4 is shown an arrangement for use with the Fig. 1 system which is primarily useful in summer air cooling for preventing the room temperature from getting too low for comfort. In this construction, the return air on its way to duct 17 flows through a duct 40 from which branch ducts 41 and 42 leading respectively to the intake and outlet ends of an air to air heat exchanger 43. The flow of air through the heat exchanger is controlled by a damper 44 which in one extreme position deflects all of the return air through the duct 41 into the heat exchanger and in the other extreme position allows all of the air to flow through the intermediate section 45 between the ducts 41 and 42. When the damper is in the latter position, the greater resistance to flow through the ducts 41 and 42 and the heat exchanger is sufficient to keep any substantial part of the return air from flowing through the heat exchanger. The heat exchanger is used to temper the condition air delivered to the room. The conditioned air from duct 7 or 8 is connected to an inlet 46 and flows to the room through an outlet 47 on the heat exchanger. Under normal conditions, the heat exchanger 43 is not used and the return air flows past the ducts 41 and 42 to the air cooling unit. When the return air temperature drops to a selected value, for example, a temperature between 75° F. and 80°, a return air thermostat 48 closes contacts 49 in circuit with a solenoid 50 which moves the damper 44 to the full line position shown in Fig. 4 deflecting the return air through the heat exchanger 43. Since under summer cooling conditions, the cooled air is kept by the thermostat $T_1$ at a temperature between 45° F. and 55° F., there is a substantial differential between the temperature of the cooled air and the return air. In the heat exchanger, the return air is cooled from, for example, 80° F. down to 62° F. while the cooled air flowing to the room is heated from, for example, 50° F. to 62° F. The cooler return air flowing to the refrigerating unit requires less cooling and accordingly requires less operating time of the refrigerating unit. At the same time, the warmer air discharged to the room prevents excessively low room temperatures. During the summer when the entire air conditioning load is a cooling load, the thermostats $T_1$ and 48 provide adequate comfort control without the need for any room thermostats or humidostats. These two thermostats are completely successful in eliminating the cold, clammy feeling common to many existing air conditioning installations where the moisture content of the room air is too high for comfort.

Instead of having the damper 44 controlled automatically by the thermostat 48, a manual control may be used in which case the occupant will set the damper 44 in accordance with individual wishes.

The arrangement of Fig. 4, whether manually or automatically controlled, is desirable in multiple outlet air conditioning systems where one of the air to air heat exchangers can be associated with each air conditioning outlet. Then, either by manually adjusting the damper 44 or by adjusting the operating point of the thermostat 48, the occupants can modify the room temperature without affecting the conditions at other outlets. From one aspect, the construction of Fig. 4 utilizes the return air for tempering the air delivered to the room. This achieves the same effect heretofore accomplished by reheat coils but does so without the addition of any source of heat. While in Fig. 4 the construction is shown applied to the return air, the same principle can be applied to a fresh air duct where the fresh air on its way to the cooling unit can be pre-cooled and at the same time the cooled air on its way to the room can be tempered or reheated so as to prevent objectionably low room temperatures.

In Fig. 5 is shown an arrangement for controlling the mixing dampers 13, 14 which is adapted to air conditioning systems having only a few outlets. In Fig. 5, the construction is shown applied only to the duct 7 and the parts previously described will be readily identified and are indicated by the same reference numerals. Instead of having a motor for controlling the mixing dampers 13, 14, the damper shaft 15 has fixed thereto a crank arm 51 connected to a bellows 52 arranged in the duct 17 for conducting return air from the conditioned air space back to the inlet 18 of the refrigerating unit. The bellows 52 can be very easily adjusted so that during the summer when the return air will, for example, have a temperature of the order of 78° F., the dampers 13, 14 will be in the position illustrated where the damper 14 completely blocks the flow of air over the heating coil 4 and the damper 13 is in the position to permit free flow of cooling air to the duct 7. On the other hand in the winter when the return air temperature will, for example, be 70° the dampers 13 and 14 are turned ninety degrees from the position illustrated so that all of the air flowing to the duct 7 must flow over the heating coil 4.

In the air conditioning system, the air cooling unit which comprises the refrigerating unit 1, the cooling coil 2, and the fan 5 can be a standard package air conditioning unit. It, accordingly, is easy to add the features of this air conditioning system to any existing installation. Another unit which is adapted to mass production is the structure comprising the mixing dampers 13, 14, 15 and the heating coil 4. These parts can conveniently be arranged in a box-like section for connection between the air outlet 6 and the air distributing ducts 7, 8. The dampers 29, 31 which control the fresh air and the damper 20 which controls the pressure of the conditioned air are readily manufactured as a unitary assembly for connection in the fresh air duct 22.

What is claimed as new is:

1. In an air conditioning system, a refrigerating unit having a cooling coil, an intake for return air, an outlet for cooled air, and a fan for circulating return air over the coil and delivering cooled air to the outlet, means forcing part of the cooled air from the delivery side of the coil prior to delivery to the outlet back to the return air side of the coil, a dew point thermostat controlling the unit to maintain a cooled air temperature of substantially 50° F. and thereby set the maximum moisture content of the conditioned air, a fresh air duct connected to the intake, a fresh air thermostat in series with the dew point thermostat having contacts open when the outside air temperature drops to the range of the dew point thermostat and closed when the outside air temperature is above that range, an auxiliary circuit around said contacts and in series with the dew point thermostat, said auxiliary circuit including contacts normally open when said first contacts are closed and closed when said first contacts are open and further including a normally open return air thermostat closed when the return air rises to a temperature requiring cooling.

2. In an air conditioning system, a refrigerating unit having a cooling coil, an intake for return air, an outlet for cooled air, and a fan for circulating return air over the coil and delivering cooled air to the outlet, a dew point thermostat controlling the unit to maintain a cooled air temperature of substantially 50° F. and thereby set the maximum moisture content of the conditioned air, a fresh air duct connected to the intake, a fresh air thermostat for cutting off the unit when the outside air temperature drops to the range of the dew point thermostat, and a return air thermostat acting through and subject to the primary control of the dew point thermostat for turning the unit on when the return air rises to a temperature requiring cooling.

3. In a room air conditioning system, a refrigerating unit having an evaporator, a fan for circulating return air from the room over the evaporator and delivering cooled air to the room, a recycling duct connecting the return air and delivery sides of the evaporator whereby part of the cooled air is conveyed over the evaporator, means responsive to the cooled air temperature for shutting off the unit, a fresh air duct connected to the return air side of the evaporator, a fresh air thermostat for shutting off the unit during the winter when the fresh air temperature is low, a damper in the fresh air duct, and means responsive to the cooled air temperature for opening the damper during the summer when the cooled air is being cooled by the unit and for closing the damper during the winter.

4. In a room air conditioning system, a refrigerating unit having an evaporator, a fan for circulating return air from the room over the evaporator and delivering cooled air to the room, a recycling duct connecting the return air and delivery sides of the evaporator, alternative controls for the unit, one control being responsive to the cooled air temperature and controlling the unit to maintain the cooled air temperature within a preselected range, the other control being responsive to return air temperature and conditioning the unit for operation subject to the first control whenever the return air is at a temperature high enough to require cooling; and a fresh air thermostat energizing the first control when it is warm outside and the second control when it is cool outside.

5. In a year round air conditioning system, a refrigerating unit having an evaporator, a fan for circulating return air from the room over the evaporator and delivering cooled air to an outlet, a recycling duct connecting the return air and the delivery sides of the evaporator, a delivery duct leading to a room, alternative controls for the unit, one control being responsive to the cooled air temperature and controlling the unit to maintain the cooled air temperature within a preselected range, the other control being responsive to return air temperature and conditioning the unit for operation subject to the first control whenever the return air is at a temperature high enough to require cooling, and a fresh air thermostat energizing the first control during the summer when it is warm outside and the second control during the summer when it is cool outside.

References Cited in the file of this patent
UNITED STATES PATENTS

| | | |
|---|---|---|
| 1,942,295 | Kerr | Jan. 2, 1934 |
| 2,125,646 | Nessell | Aug. 2, 1938 |
| 2,188,967 | Swart | Feb. 6, 1940 |
| 2,198,449 | Atkins | Apr. 23, 1940 |
| 2,283,386 | Newton | May 19, 1942 |
| 2,327,664 | Otis | Aug. 24, 1943 |
| 2,553,262 | Lehane | May 15, 1951 |
| 2,721,449 | Dennick | Oct. 25, 1955 |